United States Patent
Kook

(10) Patent No.: US 10,817,231 B2
(45) Date of Patent: Oct. 27, 2020

(54) IMAGE FORMING APPARATUS, MOBILE TERMINAL, AND METHOD FOR PROCESSING LOCAL LOGIN OF APPARATUSES

(71) Applicant: HP Printing Korea Co. Ltd., Suwon-si, Gyeonggi-do (KR)

(72) Inventor: Jinkyu Kook, SuWon-Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 82 days.

(21) Appl. No.: 16/158,932

(22) Filed: Oct. 12, 2018

(65) Prior Publication Data

US 2019/0050178 A1 Feb. 14, 2019

Related U.S. Application Data

(63) Continuation of application No. PCT/KR2017/005654, filed on May 31, 2017.

(30) Foreign Application Priority Data

Jun. 23, 2016 (KR) .................. KR10-2016-0078617

(51) Int. Cl.
*G06F 3/12* (2006.01)
*H04N 1/00* (2006.01)
*G06F 21/31* (2013.01)
*H04L 9/32* (2006.01)
*H04L 29/06* (2006.01)
(Continued)

(52) U.S. Cl.
CPC .............. *G06F 3/1238* (2013.01); *G06F 3/12* (2013.01); *G06F 3/1292* (2013.01); *G06F 21/31* (2013.01); *H04L 9/3226* (2013.01); *H04L 63/083* (2013.01); *H04N 1/00* (2013.01); *H04W 12/06* (2013.01); *G06F 3/1222* (2013.01); *H04M 1/7253* (2013.01)

(58) Field of Classification Search
CPC ..... G06F 21/31; H04L 63/083; H04L 9/3226; H04W 12/06
USPC .......................................................... 726/18
See application file for complete search history.

(56) References Cited

U.S. PATENT DOCUMENTS 9,369,450 B1* 6/2016 Barak ..................... H04L 63/20
2007/0143615 A1* 6/2007 Hiitola ................ H04M 1/7253
713/172

(Continued)

FOREIGN PATENT DOCUMENTS

JP 2005-174327 6/2005
JP 2013-183215 9/2013
(Continued)

*Primary Examiner* — Eleni A Shiferaw
*Assistant Examiner* — Angela R Holmes
(74) *Attorney, Agent, or Firm* — Jefferson IP Law, LLP

(57) ABSTRACT

A local login processing method of an image forming apparatus is provided. The local login processing method include generating session information according to a remote login request upon receiving the remote login request from a mobile terminal, transmitting the session information to the mobile terminal, receiving, from the mobile terminal, a local login request including local login information generated by using at least some of the session information, and approving the local login request by comparing the session information and the local login information.

10 Claims, 10 Drawing Sheets

(51) Int. Cl.
*H04W 12/06* (2009.01)
*H04M 1/725* (2006.01)

(56) References Cited

U.S. PATENT DOCUMENTS

2011/0066685 A1* 3/2011 Kitada .................... H04L 51/08
709/206
2012/0054493 A1 3/2012 Bradley

FOREIGN PATENT DOCUMENTS

| | | |
|---|---|---|
| JP | 2015-050612 | 3/2015 |
| KR | 10-2011-0054737 | 5/2011 |
| WO | WO-2016/006745 | 1/2016 |

* cited by examiner

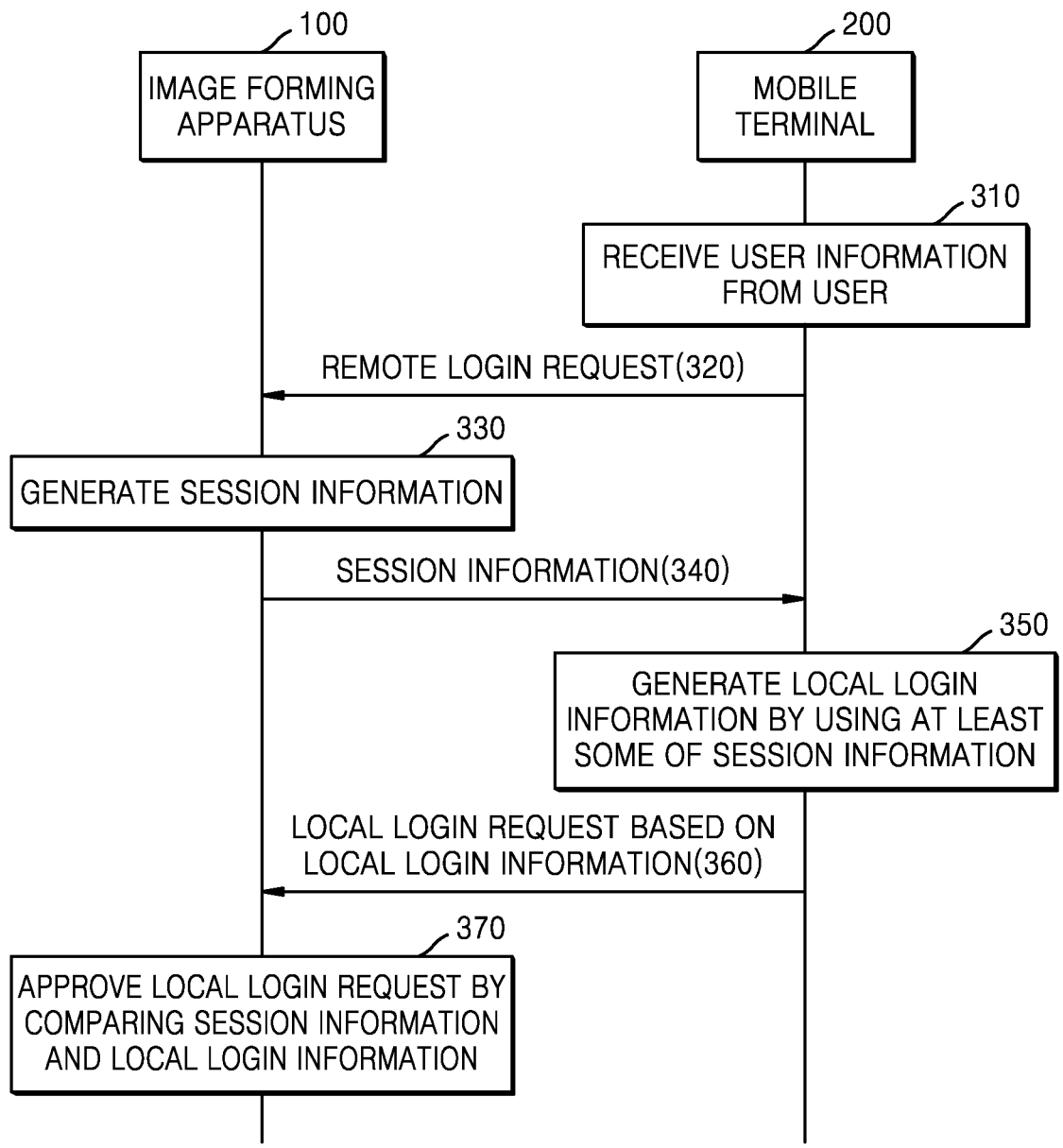

```
Request URL:
http://192.168.3.1/config/copy
Form Data:
1140 — sessionid=PRT4673
1111 — copies: 10
1112 — colormode: color
1113 — isSimplex: false
```

| User ID  | Copy Config           | PrintConfig |
|----------|-----------------------|-------------|
| JQ.KOOK  | Copies10/color/duplex | ...         |
| ...      | ...                   | ...         |

| PRINTER | SESSION ID | USER ID | EXPIRATION DATE | PRINTER IP |
|---|---|---|---|---|
| A | PRT4673 | JQ.KOOK | 2016031014 | 192.168.3.1 |
| B | DEVICE341 | JQ.KOOK | 2016031011 | 192.168.3.2 |
| C | APPARATUS3 | JQ.KOOK | 2016031019 | 192.168.3.3 |

IMAGE FORMING APPARATUS, MOBILE TERMINAL, AND METHOD FOR PROCESSING LOCAL LOGIN OF APPARATUSES

BACKGROUND ART

With recent developments in electronic communication-related technology and network-related technology, various services using such technologies are being developed and released. According to such a trend, an image forming apparatus, such as a multi-function printer (MFP), may include communication equipment and support a service using the communication equipment.

In more detail, an image forming apparatus may provide a remote control system by using such technologies. In other words, a system by which a user may remotely access an image forming apparatus through a mobile terminal to control the image forming apparatus may be provided.

For example, the image forming apparatus may support a pull printing function, in which print data is stored in a server and is output, via user authentication, by a printer capable of connecting to the server. In this case, the user may remotely log in to the image forming apparatus by using the mobile terminal to transmit a document stored in the mobile terminal to the image forming apparatus, and output the transmitted document by logging in to the image forming apparatus.

Accordingly, when the user is remotely logged in to the image forming apparatus, the user locally logs in to the image forming apparatus to directly manipulate the image forming apparatus.

BRIEF DESCRIPTION OF DRAWINGS

The above and other aspects, features, and advantages of certain examples of the disclosure will be more apparent from the following description taken in conjunction with the accompanying drawings, in which:

FIG. 3 is a flow diagram of a local login processing method in a local login processing system, according to an example.

Throughout the drawings, it should be noted that like reference numbers are used to depict the same or similar elements, features, parts, components, and structures.

DETAILED DESCRIPTION

Various examples will now be described with reference to the accompanying drawings. The examples described may be modified and have different forms. For clear description of features of the examples, detailed descriptions related to technologies well-known to one of ordinary skill in the art are omitted.

In the specification, when a component is "connected" to another component, the component may be "directly connected" to the other component, or may be "indirectly connected" to the other component via another component therebetween. Also, when a component "includes" another component, the component may further include other components unless indicated otherwise.

Throughout the specification, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a copier, a scanner, a fax machine, a multi-function printer (MFP), a display device, or the like.

Also, a "user" may denote a person who performs manipulation related to an image forming job by using an image forming apparatus or a device connected to the image forming apparatus wirelessly or via wires. Also, a "manager" may denote a person who has authority to access all functions and systems of an image forming apparatus. A "manager" and a "user" may be the same person.

Also, "remote login" denotes that a user remotely logs in to an image forming apparatus from a device other than the image forming apparatus.

Also, "local login" denotes that a user logs in to an image forming apparatus by directly manipulating the image forming apparatus.

Figure 1:
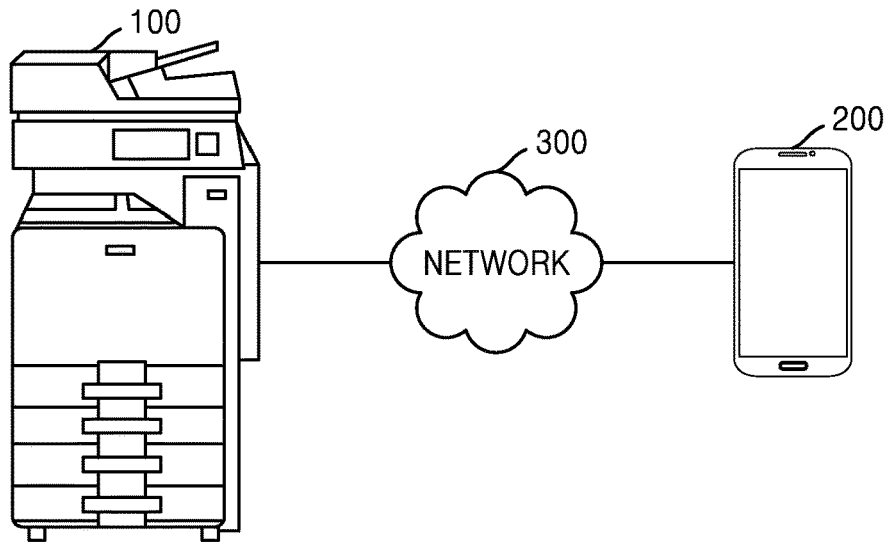
FIG. 1 is a diagram of a local login processing system according to an example.

FIG. 1 is a diagram of a local login processing system according to an example.

Referring to FIG. 1, a local login processing system may include an image forming apparatus 100, a mobile terminal 200, and a network 300. In the illustrated example, the image forming apparatus 100 and the mobile terminal 200 are connected through the network 300.

The image forming apparatus 100 supports remote login using the mobile terminal 200. Also, the image forming apparatus 100 supports local login using the mobile terminal 200, in addition to local login via a user's direct manipulation. According to an example, the image forming apparatus 100 may include an apparatus, such as a fax machine, a copier, a printer, a scanner, a multi-function printer (MFP), or the like.

The mobile terminal 200 may perform remote login by accessing the image forming apparatus 100 through the network 300. Also, the mobile terminal 200 may perform local login. According to an example, the mobile terminal 200 may include an apparatus, such as a laptop computer, a tablet personal computer (PC), a mobile phone, a wearable device, or the like.

The network 300 performs a function of connecting the image forming apparatus 100 and the mobile terminal 200. According to an example, the network 300 may include a wired/wireless network, the Internet, an Intranet, a local area network (LAN), a wireless local area network (WLAN), a wide area network (WAN), or the like.

Figure 2:
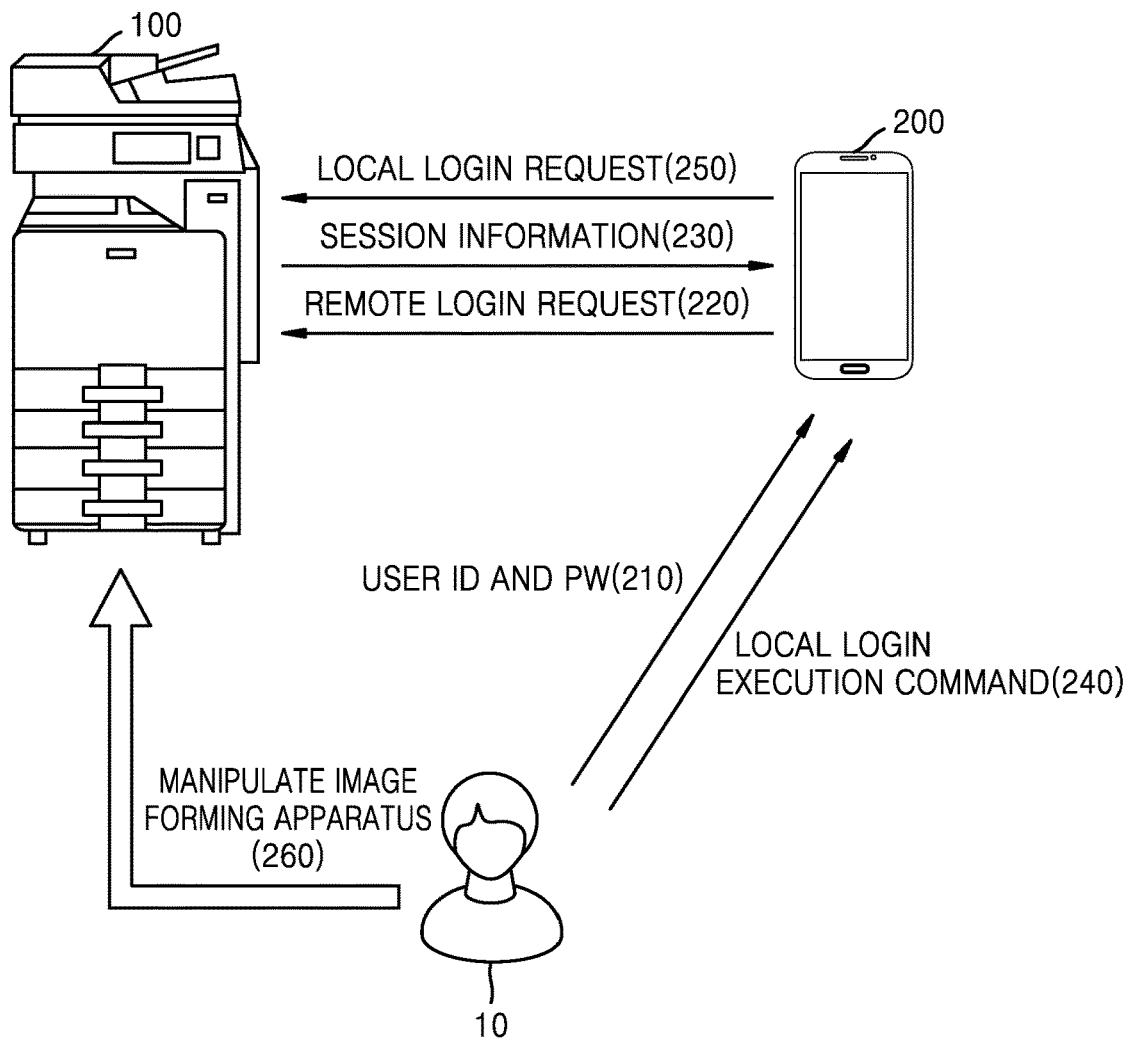
FIG. 2 is a diagram schematically illustrating a local login processing method in a local login processing system, according to an example.

FIG. 2 is a diagram schematically illustrating a local login processing method in a local login processing system, according to an example.

Referring to FIG. 2, the mobile terminal 200 receives a user identification (ID) and a password (PW) from a user 10 to remotely log in to the image forming apparatus 100 in operation 210. In operation 220, the mobile terminal 200 requests the image forming apparatus 100 to undertake remote login, based on the user ID and the password (PW) received from the user 10.

Upon receiving a remote login request from the mobile terminal 200, the image forming apparatus 100 determines whether to approve the remote login, based on user information. According to an example, when the image forming apparatus 100 approves the remote login, the image forming apparatus 100 generates session information based on the user information.

In operation 230, the image forming apparatus 100 transmits the generated session information to the mobile terminal 200. As such, when the image forming apparatus 100 transmits the session information to the mobile terminal 200, a session between the image forming apparatus 100 and the mobile terminal 200 begins.

In operation 240, the mobile terminal 200 receives a local login execution command from the user 10 to locally login to the image forming apparatus 100, and in operation 250, the mobile terminal 200 requests the image forming apparatus 100 for local login.

Upon receiving a local login request from the mobile terminal 200, the image forming apparatus 100 determines whether to approve the local login based on the session information. When the image forming apparatus 100 approves the local login, the user 10 may manipulate the image forming apparatus 100 in operation 260.

According to an example, the user 10 does not need to directly perform local login on the image forming apparatus 100 because the mobile terminal 200 requests the image forming apparatus 100 to undertake the local login by using the session information of the session that has begun. Accordingly, the user 10 may conveniently perform the local login through simple manipulation of the mobile terminal 200, for example, through a small number of touch inputs, or the like.

Hereinafter, a local login processing method will be described in more detail with reference to a flow diagram.

FIG. 3 is a flow diagram of a local login processing method in a local login processing system, according to an example.

Referring to FIG. 3, the mobile terminal 200 receives user information from the user 10 in operation 310. According to an example, the user information may include a user ID for identifying the user 10 and a password for user authentication. According to an example, the mobile terminal 200 may provide a user interface to receive an input from the user 10. The user 10 may input the user information by using the user interface provided by the mobile terminal 200. This is described in more detail with reference to FIG. 4A.

Figure 4A:
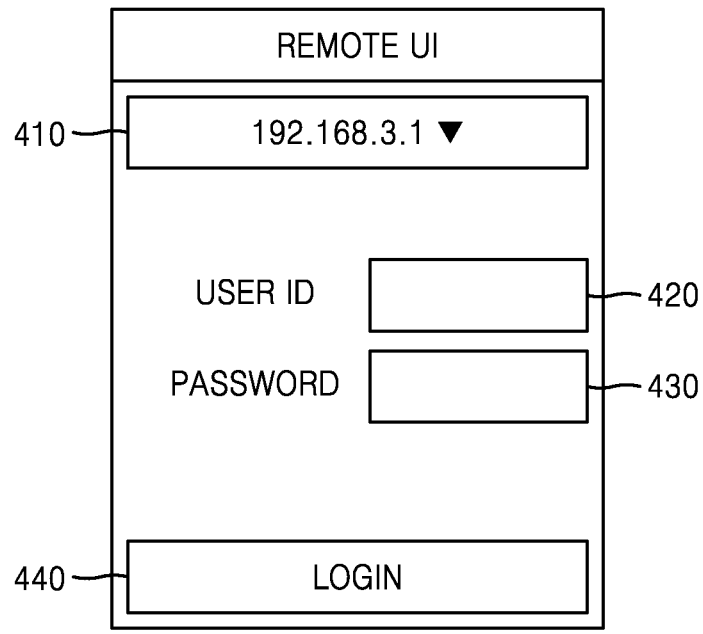
FIGS. 4A and 4B are diagrams illustrating user interfaces of an image forming apparatus, according to various examples.

FIG. 4A is a diagram illustrating a user interface of an image forming apparatus, according to an example.

Referring to FIG. 4A, a user interface, in which a field 410 displaying an address value of the image forming apparatus 100 to be remotely logged into, a field 420 in which a user ID may be input, a field 430 in which a password may be input, and an input button 440 in which a login command may be input are displayed, is illustrated.

According to an example, the user 10 may select the image forming apparatus 100 to be remotely logged into, through the field 410 displaying the address value of the image forming apparatus 100. Also, the user ID and the password are respectively input through the field 420 in which the user ID may be input and the field 430 in which the password may be input, and a remote login command may be input to the mobile terminal 200 through the input button 440 in which the login command is input.

Referring again to FIG. 3, the mobile terminal 200 requests the image forming apparatus 100 to undertake remote login in operation 320, based on the user information received from the user 10. According to an example, the mobile terminal 200 may request the remote login by transmitting the user information received from the user 10 according to an example to the image forming apparatus 100. In more detail, the mobile terminal 200 may transmit the user ID and the password received from the user 10 to the image forming apparatus 100.

Upon receiving a remote login request from the mobile terminal 200, the image forming apparatus 100 determines whether to approve the remote login, based on the user information. According to an example, the image forming apparatus 100 may compare user information, for example a user ID and a password stored therein, with the user information received from the mobile terminal 200, and approve the remote login when the stored user information and the received user information match each other.

According to an example, the image forming apparatus 100 may store at least one piece of user information in a table form. A table storing user information as such may be referred to as an account table.

When the image forming apparatus 100 approves the remote login, the image forming apparatus 100 generates session information based on the user information in operation 330. According to an example, the session information may include a session ID, a user ID, a unique ID (e.g., a media access control (MAC) address, a serial number, or the like) of the mobile terminal 200, a session expiration time, etc. The image forming apparatus 100 may generate different session information per user. For example, when it is determined that a user is a temporary user, session information having a short session expiration time may be generated.

According to an example, the image forming apparatus 100 may store the generated session information. For example, the image forming apparatus 100 may store the session information in a table form. A table storing session information as such may be referred to as a session table.

In operation 340, the image forming apparatus 100 transmits the generated session information to the mobile terminal 200. As such, when the image forming apparatus 100 transmits the session information to the mobile terminal 200, a session between the image forming apparatus 100 and the mobile terminal 200 begins.

According to an example, the mobile terminal 200 may store the received session information and may store the session information in a table form. In other words, the session information may be stored in a session table. According to an example, an item stored in the session table of the mobile terminal 200 may not match an item stored in a session table of the image forming apparatus 100. For example, the session table of the mobile terminal 200 may include a session ID, a user ID, a printer address, a session expiration time, etc. In other words, unlike the session table of the image forming apparatus 100 storing the unique ID of the mobile terminal 200, the session table of the mobile terminal 200 may include an address of the image forming apparatus 100.

After the session begins, the mobile terminal 200 may receive a local login execution command from the user 10. The user 10 may input the local login execution command to the image forming apparatus 100 by using the mobile terminal 200, while being remotely logged in to the image forming apparatus 100 by using the mobile terminal 200.

According to an example, the mobile terminal 200 may provide a user interface to receive an input from the user 10. The user 10 may input the local login execution command by using the user interface provided by the mobile terminal 200. This is described in more detail with reference to FIG. 4B.

Figure 4B:
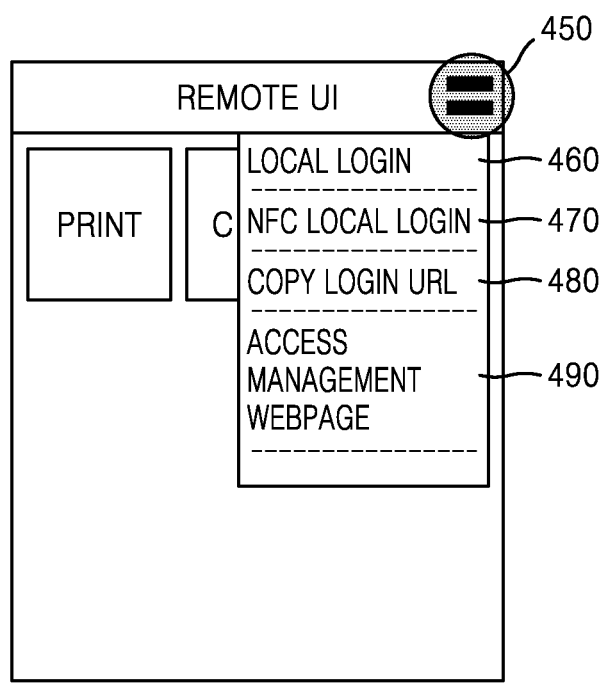

FIG. 4B is a diagram illustrating a user interface of an image forming apparatus, according to an example.

Referring to FIG. 4B, when a menu button 450 is pressed in the user interface, a local login execution button 460, a local login execution button using near field communication (NFC) 470, a button 480 for copying a universal resource locator (URL) to be logged in, and a button 490 for accessing a management webpage may be displayed for selection by the user 10.

According to an example, the user 10 may input a local login command to the mobile terminal 200 through the local login execution button 460.

Referring again to FIG. 3, when the mobile terminal 200 receives the local login execution command from the user 10, the mobile terminal 200 generates local login information based on at least some of the received session information, in operation 350. According to an example, the mobile terminal 200 may generate a request URL including, as the local login information, at least some of the session information.

According to an example, the mobile terminal 200 may generate the local login information, based on the session ID included in the received session information. This is described in more detail with reference to FIG. 5.

Figure 5:
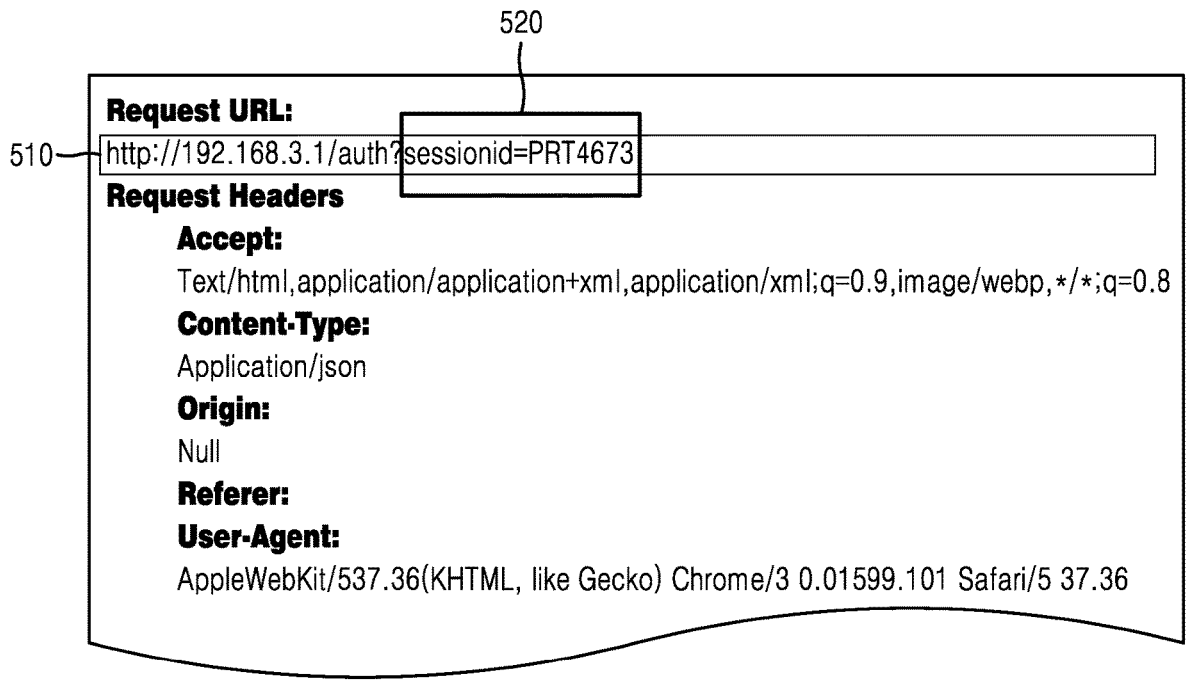
FIG. 5 is a diagram illustrating local login information according to an example.

FIG. 5 is a diagram illustrating local login information according to an example.

Referring to FIG. 5, the mobile terminal 200 may generate a request URL 510 including a session ID 520. However, the present disclosure is not limited thereto, and the mobile terminal 200 may generate the request URL 510 including a session ID, a user ID, a unique ID (e.g., a MAC address, a serial number, or the like) of the mobile terminal 200, a session expiration time, etc.

Referring again to FIG. 3, according to an example, the mobile terminal 200 may generate a personal identification number (PIN) code based on the received session information, and generate the local login information based on the generated PIN code. For example, the mobile terminal 200 may generate the PIN code by using the session ID, the user ID, the unique ID (e.g., the MAC address, the serial number, or the like) of the mobile terminal 200, the session expiration time, a current time, etc. In this case, the PIN code may be inserted into a location of the session ID 520 in the request URL 510 described with reference to FIG. 5. Alternatively, the PIN code may be inserted together with the session ID 520.

According to an example, the mobile terminal 200 may generate the PIN code by using the same algorithm as the image forming apparatus 100. According to an example, the mobile terminal 200 and the image forming apparatus 100 generate the PIN codes by using the same algorithm based on the same session information, such that approval of the local login may be determined based on whether the PIN codes match each other.

According to an example, when the PIN code is generated by using a current time, but current times in the mobile terminal 200 and the image forming apparatus 100 are different, the generated PIN codes may be different. In this case, the current times in the mobile terminal 200 and the image forming apparatus 100 should be matched.

In operation 360, the mobile terminal 200 requests the image forming apparatus 100 to undertake local login, based on the local login information. According to an example, the mobile terminal 200 may also request the image forming apparatus 100 for the local login by using various access methods, such as a wireless network, NFC, etc.

The image forming apparatus 100 performs operation 370 upon receiving, from the mobile terminal 200 in operation 360, a local login request including the local login information generated by using at least some of the session information.

In operation 370, the image forming apparatus 100 approves the local login request by comparing the session information and the local login information. According to an example, the image forming apparatus 100 may approve the local login request by comparing the session information with at least some of the session information included in the local login information. In more detail, the image forming apparatus 100 may determine whether at least some of the session information included in the local login request matches the session information generated and stored in operation 330, and approve the local login request when they match. For example, when the local login information includes the session ID, the image forming apparatus 100 may compare the session ID included in the local login information and the session ID stored in the session table of the image forming apparatus 100, and approve the local login request when the session IDs match.

According to an example, the local login information may include the PIN code generated by the mobile terminal 200 based on the session information. When the local login information includes the PIN code, the image forming apparatus 100 may generate the PIN code based on the session information generated and stored in operation 330, and approve the local login request when the generated PIN code and the PIN code included in the local login information match each other. In more detail, the image forming apparatus 100 may generate the PIN code by using the session ID, the user ID, the unique ID (e.g., the MAC address, the serial number, or the like) of the mobile terminal 200, the session expiration time, the current time, etc.

According to an example, the image forming apparatus 100 may generate the PIN code by using the same algorithm as the mobile terminal 200. According to an example, the image forming apparatus 100 and the mobile terminal 200 generate the PIN codes by using the same algorithm based on the same session information, such that approval of the local login is determined by determining whether the PIN codes match each other.

According to an example, when the PIN code is generated by using a current time, but current times in the image forming apparatus 100 and the mobile terminal 200 are different, the generated PIN codes may be different. In this case, the current times in the image forming apparatus 100 and the mobile terminal 200 should be matched.

According to an example, the mobile terminal 200 requests the image forming apparatus 100 to undertake the local login by using the session information of the session that has begun, and thus the user 10 does not need to directly perform the local login on the image forming apparatus 100. Accordingly, the user 10 may conveniently perform the local login through simple manipulation of the mobile terminal 200, for example, through a small number of touch inputs, or the like.

Figure 6:
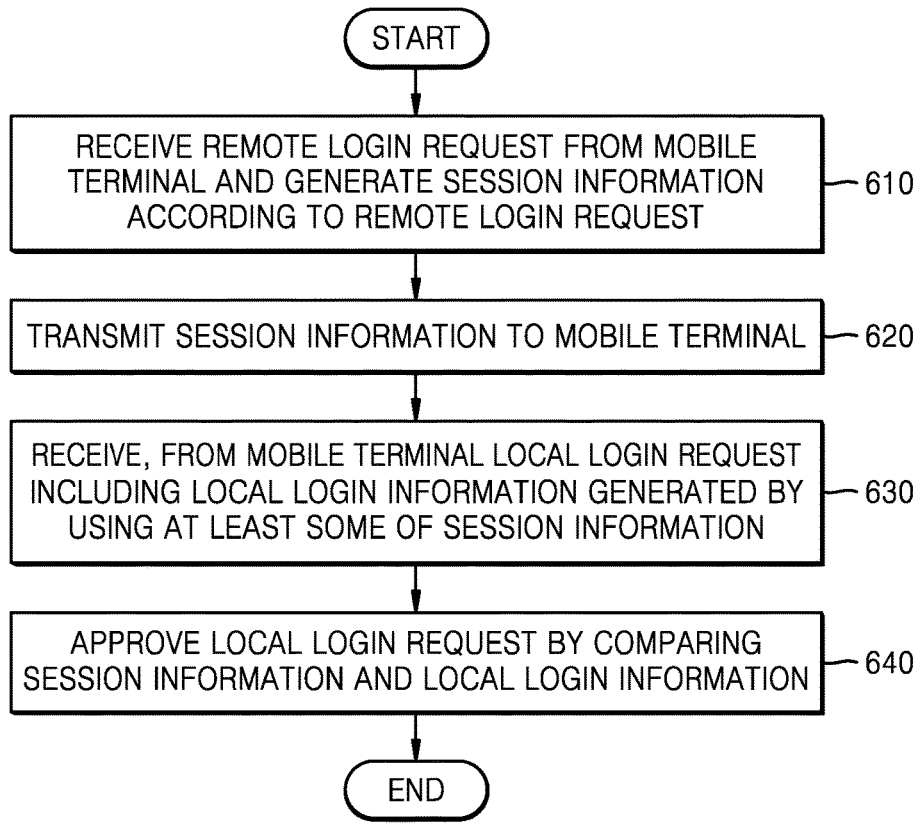
FIG. 6 is a flowchart of a local login processing method of an image forming apparatus, according to an example.
Figure 7:
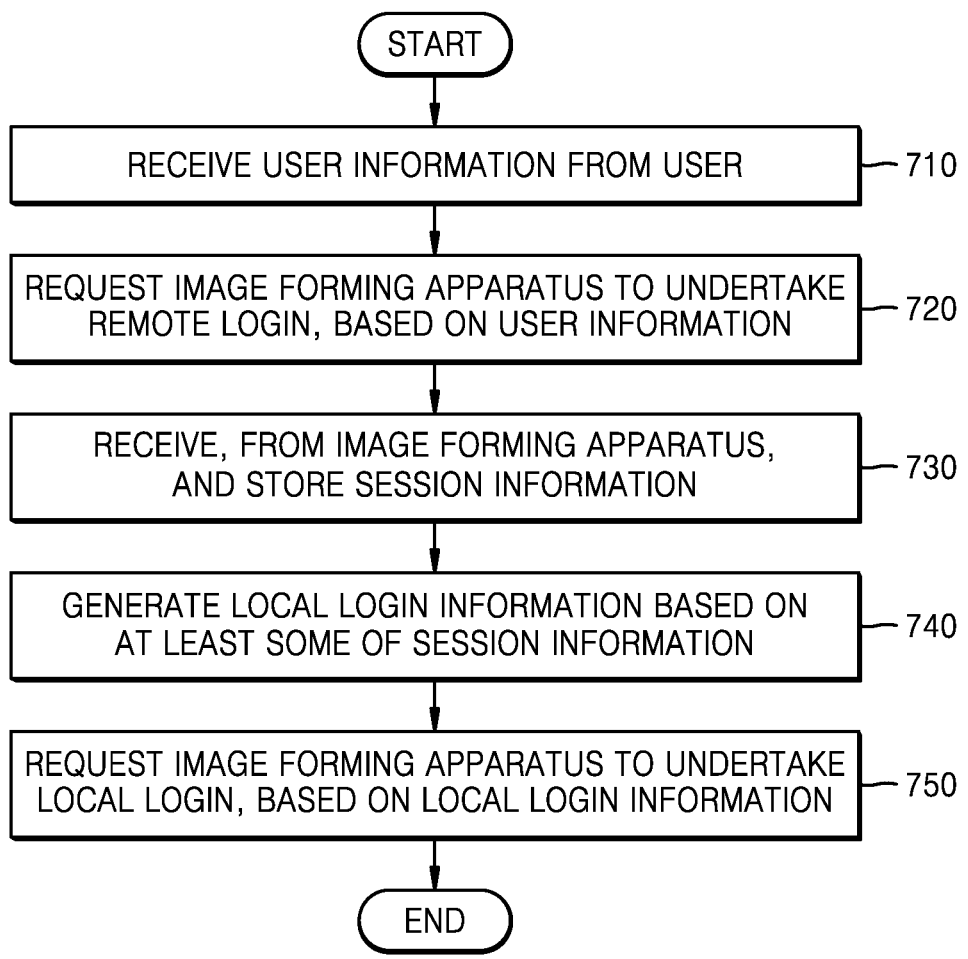
FIG. 7 is a flowchart of a local login processing method of a mobile terminal, according to an example.

FIGS. 6 and 7 are respectively flowcharts of local login processing methods of the image forming apparatus 100 and the mobile terminal 200. Examples that overlap with the above descriptions will be only briefly described while describing FIGS. 6 and 7.

FIG. 6 is a flowchart of a local login processing method of an image forming apparatus, according to an example.

Referring to FIG. 6, the image forming apparatus 100 receives a remote login request from the mobile terminal 200 and generates session information according to the remote login request in operation 610. In operation 620, the image forming apparatus 100 transmits the generated session information to the mobile terminal 200.

In operation 630, the image forming apparatus 100 receives, from the mobile terminal 200, a local login request including local login information generated by using at least some of the session information. According to an example, the local login information may include at least one of a session ID included in the session information and a PIN code generated based on the session information.

In operation 640, the image forming apparatus 100 approves the local login request by comparing the session information and the local login information. According to an example, the image forming apparatus 100 may approve the local login request by comparing the session information and at least some of the session information included in the local login information.

According to an example, when the local login information includes a PIN code, the image forming apparatus 100 may generate a PIN code based on the session information, and approve the local login request when the generated PIN code and the PIN code included in the local login information match each other.

FIG. 7 is a flowchart of a local login processing method of a mobile terminal, according to an example.

Referring to FIG. 7, the mobile terminal 200 receives user information from the user 10 in operation 710. In operation 720, the mobile terminal 200 requests the image forming apparatus 100 to undertake remote login, based on the user information.

In operation 730, the mobile terminal 200 receives session information from the image forming apparatus 100 and stores the session information. In operation 740, the mobile terminal 200 generates local login information based on at least some of the session information. According to an example, the mobile terminal 200 may generate the local login information based on a session ID included in the session information. Also, the mobile terminal 200 may generate a PIN code based on the session information, and generate the local login information based on the generated PIN code.

In operation 750, the mobile terminal 200 may request the image forming apparatus 100 to undertake local login, based on the local login information.

A local login processing method of an image forming apparatus according to an example will be described with reference to FIGS. 8 and 9. Examples that overlap with the above descriptions will be only briefly described while describing the local login processing method of the image forming apparatus according to an example. In particular, a process of beginning a session between the image forming apparatus 100 and the mobile terminal 200 is substantially the same as that described above, and thus, such overlapping descriptions will not be fully provided again.

Figure 8:
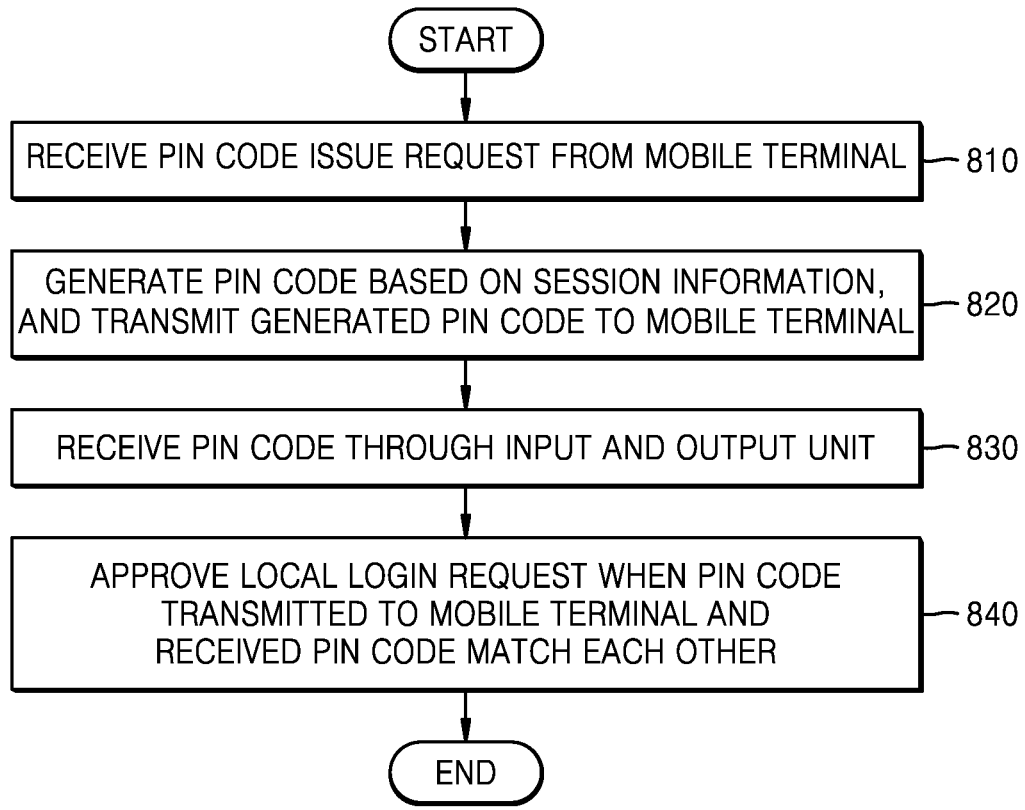
FIG. 8 is a flowchart of a local login processing method of an image forming apparatus, according to an example.

FIG. 8 is a flowchart of a local login processing method of an image forming apparatus, according to an example.

Referring to FIG. 8, the image forming apparatus 100 receives a PIN code issue request from the mobile terminal 200 in operation 810. In operation 820, the image forming apparatus 100 generates a PIN code based on session information, and transmits the generated PIN code to the mobile terminal 200. As an example, the image forming apparatus 100 may search for a user ID based on the session information, and generate a PIN code corresponding to the user ID. When the image forming apparatus 100 receives a PIN code, the image forming apparatus 100 may check the user ID corresponding to the PIN code.

In operation 830, the image forming apparatus 100 receives a PIN code through an input and output unit. According to an example, the image forming apparatus 100 may provide a user interface for manipulation by the user 10 and for displaying a state of the image forming apparatus 100. The user 10 may manipulate the image forming apparatus 100 and check the state by using the user interface provided by the image forming apparatus 100. This is described with reference to FIG. 10B.

Figure 10A:
FIGS. 10A and 10B are diagrams illustrating user interfaces of a mobile terminal and an image forming apparatus, according to various examples.
Figure 10B:
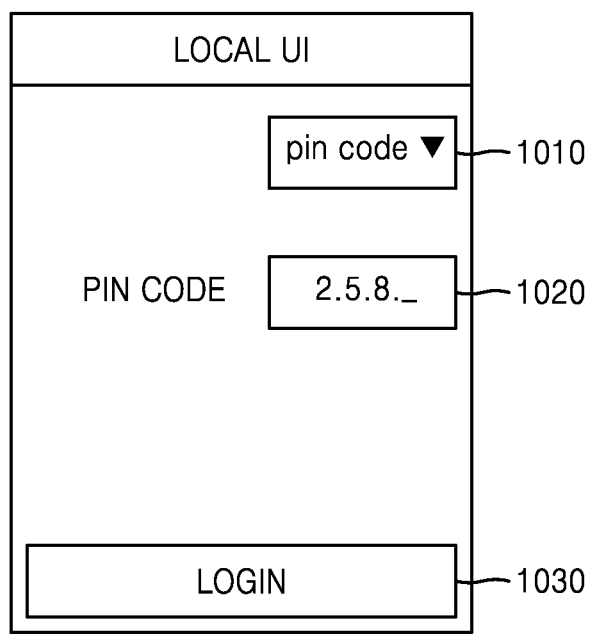

FIG. 10B is a diagram illustrating a user interface of an image forming apparatus, according to an example.

Referring to FIG. 10B, a user interface, in which a field 1010 for selecting a PIN code input menu, a PIN code input field 1020, and an input button 1030 for inputting a login command are displayed, is illustrated.

According to an example, the user 10 may input a PIN code into the PIN code input field 1020, and input a local login command to the image forming apparatus 100 through the input button 1030 for inputting a login command.

Referring again to FIG. 8, in operation 840, the image forming apparatus 100 approves a local login request when the PIN code transmitted to the mobile terminal 200 and the received PIN code match each other.

Figure 9:
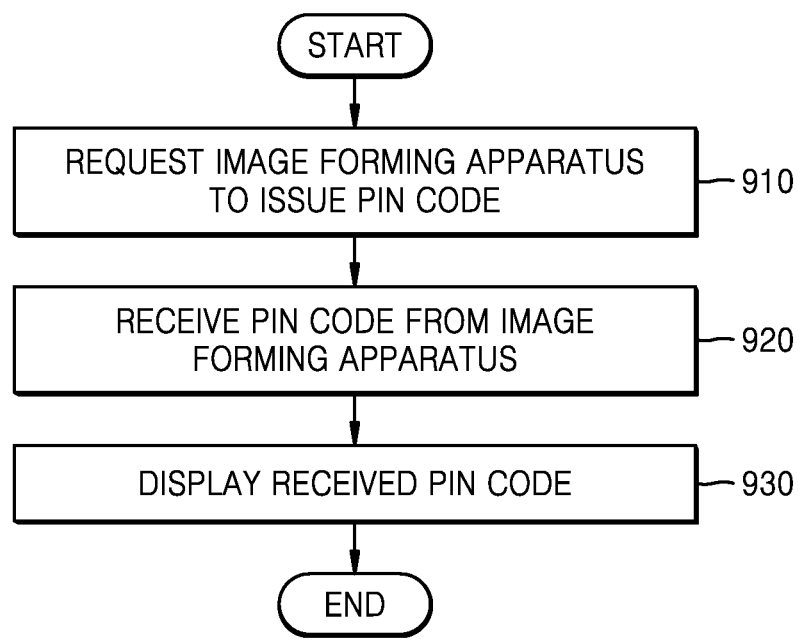
FIG. 9 is a flowchart of a local login processing method of a mobile terminal, according to an example.

FIG. 9 is a flowchart of a local login processing method of a mobile terminal, according to an example.

Referring to FIG. 9, the mobile terminal 200 requests the image forming apparatus 100 to issue a PIN code, according to a user command, in operation 910. According to an example, the mobile terminal 200 may request the image forming apparatus 100 to issue a PIN code by using session information. In more detail, the mobile terminal 200 may use a session ID. The session information may be used by the image forming apparatus 100 to identify the mobile terminal 200.

In operation 920, the mobile terminal 200 receives a PIN code from the image forming apparatus 100, and displays the received PIN code in operation 930. According to an example, the mobile terminal 200 may provide a user interface for manipulation by the user 10 and for displaying a state of the mobile terminal 200. The user 10 may manipulate the image forming apparatus 100 and check the state by using the user interface provided by the mobile terminal 200. This is described in more detail with reference to FIG. 10A.

FIG. 10A is a diagram illustrating a user interface of a mobile terminal, according to an example.

Referring to FIG. 10A, a PIN code 1040 received from the image forming apparatus 100 is displayed to the user 10. According to an example, the mobile terminal 200 may emphasize the PIN code 1040 by blurring a background other than the PIN code 1040. Although the PIN code 1040 is illustrated in FIG. 10A as "2580," it is to be understood that this is merely an example.

According to an example, the mobile terminal 200 may request the image forming apparatus 100 for a PIN code by using session information of a session that has begun, and the image forming apparatus 100 may generate and transmit, to the mobile terminal 200, a PIN code by using the session information. Accordingly, the user 10 may conveniently perform local login via a simple manipulation, for example, input of a 4-digit PIN code.

According to an example, the image forming apparatus 100 may receive and store job setting information from the mobile terminal 200, and, when the user 10 locally logs in, the image forming apparatus 100 may display a job setting state to which the stored job setting information is applied. A setting storing and importing method between an image forming apparatus and a mobile terminal will be described in more detail with reference to FIGS. 11A through 11C.

Figures 11A, 11B, 11C:
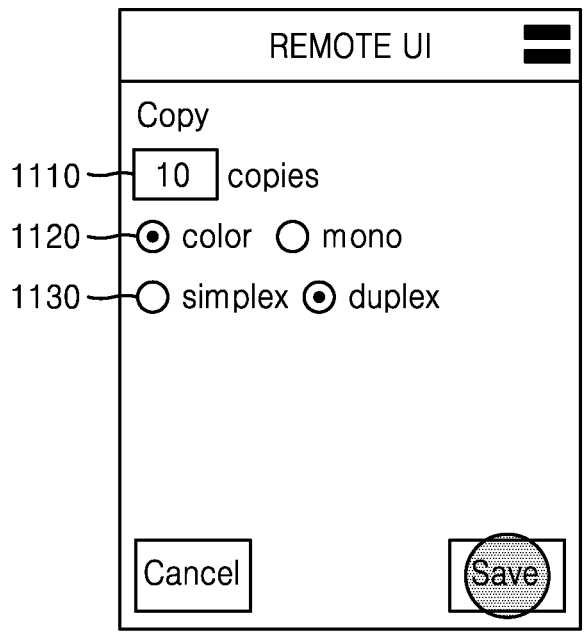
FIGS. 11A through 11C are diagrams for describing a job setting storing and importing method according to various examples.

FIGS. 11A though 11C are a diagram for describing a job setting storing and importing method according to various example.

According to an example, the mobile terminal 200 may receive a job setting value from the user 10, and store the job setting value as job setting information.

Referring to FIG. 11A, the mobile terminal 200 may receive the job setting value from the user 10 by providing a field 1110 for inputting the number of copies, a color or mono select button 1120, and a simplex or duplex select button 1130. Of course, these illustrated job setting options are only examples and are not to be construed as excluding the use of other job setting options.

The mobile terminal 200 transmits the stored job setting information to the image forming apparatus 100. According to an example, while transmitting the job setting information, session information may be used to identify a user of a job setting.

Referring to FIG. 11B, transmitted data includes session ID 1140 together with job setting values 1111, 1112, and 1113. The image forming apparatus 100 may receive the job setting information, and check the session information to identify the user of the job setting. The image forming apparatus 100 may store the received job setting information.

Referring to FIG. 11C, the image forming apparatus 100 may store the job setting information in a table form. As such, a table storing the job setting information may be referred to as a user configuration table.

When a local login request is approved, the image forming apparatus 100 may apply the stored job setting information, based on local login information. According to an example, the image forming apparatus 100 may identify the user by using the session information included in the local login information, and apply the job setting information of the user.

The image forming apparatus 100 may display a job setting state to which the job setting information is applied.

According to an example, the user 10 may use a setting used by the mobile terminal 200 as it is in the image forming apparatus 100.

According to an example, when the mobile terminal 200 has a plurality of valid sessions, the mobile terminal 200 may change a session according to selection of the user 10. A session changing process will be described in more detail with reference to FIGS. 12A and 12B.

Figures 12A, 12B:
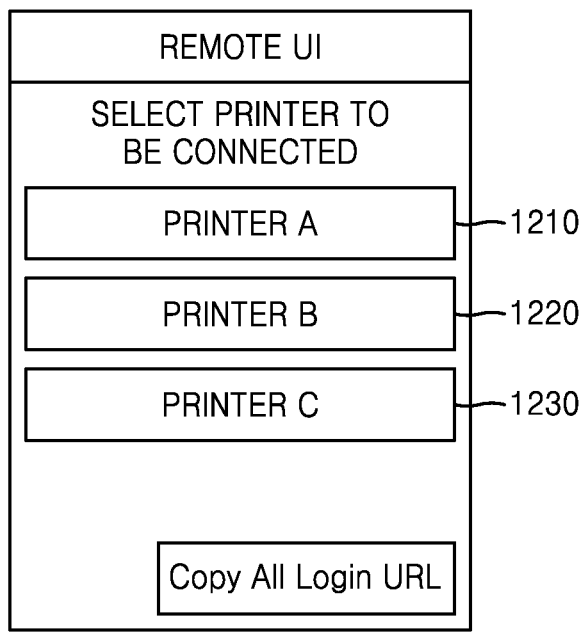
FIGS. 12A and 12B are diagrams for describing a session changing process of a mobile terminal, according to various examples.

FIGS. 12A and 12B are diagrams for describing a session changing process of a mobile terminal, according to various examples.

According to an example, the mobile terminal 200 may display a list of valid image forming apparatuses, based on session information that is currently stored.

Referring to FIG. 12A, the list of valid image forming apparatuses includes a printer A 1210, a printer B 1220, and a printer C 1230. In FIG. 12A, a printer name is displayed in the list, but a valid printer may be displayed using a printer internet protocol (IP) address. For example, instead of "printer A," 192.168.3.1, i.e., an IP address of the printer A, may be displayed.

The mobile terminal 200 receives, from the user 10, an input of selecting one of the image forming apparatuses displayed in the list. The mobile terminal 200 may execute a session corresponding to an image forming apparatus selected by the user 10.

Referring to FIG. 12B, a session table stored in the mobile terminal 200 is illustrated. According to an example, the mobile terminal 200 may search the session table for a session ID corresponding to the image forming apparatus selected by the user 10, and execute a session corresponding to the session ID.

According to an example, when a plurality of sessions are executed, the user 10 may conveniently change a session.

According to an example, the mobile terminal 200 may generate a management webpage address of the image forming apparatus 100, based on local login information, and access the management webpage address of the image forming apparatus 100 or transmit the management webpage address of the image forming apparatus 100 to a set device.

According to an example, the user 10 may conveniently access the management webpage address of the image forming apparatus 100 by using already-generated session information.

The above examples may be embodied in a form of a non-transitory computer-readable recording medium storing computer-executable instructions and data. At least one of the instructions and data may be stored in a form of a program code, and may perform a certain operation by generating a certain program module when executed by a processor.

The non-transitory computer-readable recording medium may denote, for example, a magnetic storage medium, such as a hard disk, or an optical recording medium, such as a CD or a DVD, or may denote a memory included in a server accessible through a network. For example, the computer-readable recording medium may be at least one of a memory of the image forming apparatus 100 or a memory of an input and output unit, or may be a memory included in the mobile terminal 200 connected to the image forming apparatus 100 through a network.

Hereinafter, configurations of apparatuses forming a login processing system, i.e., the image forming apparatus 100 and the mobile terminal 200, are described in more detail.

Figure 13:
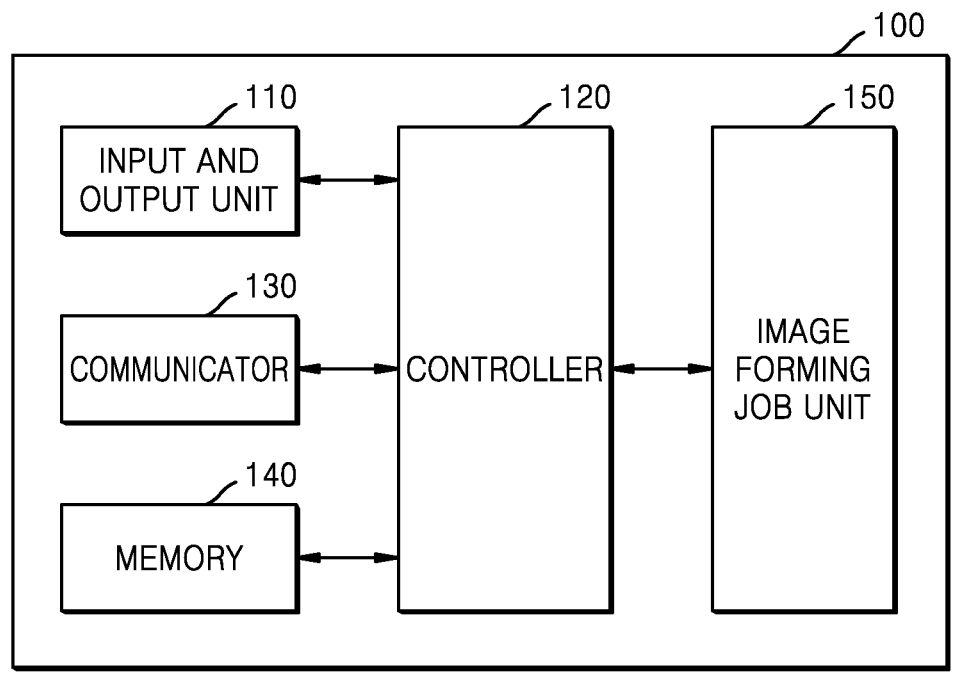
FIG. 13 is a diagram of a structure of an image forming apparatus, according to an example.

FIG. 13 is a diagram of a structure of an image forming apparatus, according to an example.

Referring to FIG. 13, the image forming apparatus 100 may include an input and output unit 110, a controller 120, a communicator 130, a memory 140, and an image forming job unit 150. Also, although not illustrated, the image forming apparatus 100 may further include a power source for supplying power to each component.

The input and output unit 110 may include an input unit for receiving, from a user, an input for performing an image forming job or the like, and an output unit for displaying information, such as a result of performing the image forming job, a state of the image forming apparatus 100, or the like. For example, the input and output unit 110 may include an operation panel receiving a user input, a display panel displaying a screen, etc.

In more detail, the input unit may include one or more apparatus capable of receiving various types of user inputs, such as a keyboard, a physical button, a touch screen, a camera, a microphone, or the like. Also, the output unit may include, for example, a display panel, a speaker, or the like. However, the present disclosure is not limited thereto, and the input and output unit 110 may include an apparatus supporting various inputs and outputs.

The input and output unit 110 may include an independent control system. In other words, in addition to the controller 120 of the image forming apparatus 100, the input and output unit 110 may include a control system (e.g., a controller, a memory, etc.) for controlling a user interface (UI) provided by the input and output unit 110. Also, an operating system (OS) for providing a UI, and programs, such as applications for supporting various functions, may be installed in the control system of the input and output unit 110. In this case, the input and output unit 110 may include an input and output controller, a display unit, an operation panel, a memory, etc.

According to an example, the input and output unit 110 may include an independent control system (e.g., an input and output controller, a memory, etc.) separately from the controller 120. The input and output controller and the memory may control a user interface provided by the input and output unit 110. The input and output controller may include a processor, such as a central processing unit (CPU), like the controller 120, but the input and output unit 110 may not include the input and output controller. That is, the controller 120 of the image forming apparatus 100 may replace the input and output controller. Also, the display unit may include a liquid crystal display (LCD) panel or an organic light-emitting display (OLED) panel, and the operation panel may include a physical button, a touch screen, or the like.

The input and output unit 110 may be separated from the image forming apparatus 100. For example, the input and output unit 110 may operate similarly to a tablet PC when separated from the image forming apparatus 100, and perform an input and output function when combined with the image forming apparatus 100. The input and output unit 110 that is separable may further include a communicator for communicating with an external apparatus.

According to an example, the input and output unit 110 may receive, from the user, a PIN code for local login.

The controller 120 may control operations of the image forming apparatus 100, and include a processor, such as a CPU. The controller 120 may control other components included in the image forming apparatus 100 to perform operations corresponding to a user input received through the input and output unit 110.

For example, the controller 120 may execute a program stored in the memory 140, read a file stored in the memory 140, or store a new file in the memory 140.

According to an example, the controller 120 may execute a program for processing local login to generate session information according to a remote login request by receiving the remote login request from the mobile terminal 200, transmit the session information to the mobile terminal 200, receive, from the mobile terminal 200, a local login request including local login information generated by using at least some of the session information, and approve the local login request by comparing the session information and the local login information. Here, the local login information may include at least one of a session ID included in the session information and a PIN code generated based on the session information. When the local login information includes a PIN code, the controller 120 may generate a PIN code based on the session information, and approve the local login request when the generated PIN code and the PIN code included in the local login information match each other. Here, the controller 120 may generate the PIN code by using the same algorithm as the mobile terminal 200.

According to an example, the controller 120 may approve the local login request by comparing the session information and at least some of the session information included in the local login request.

Also, according to an example, the controller 120 may receive a PIN code issue request from the mobile terminal 200, generate and transmit, to the mobile terminal 200, a PIN code based on the session information, and receive a PIN code through the input and output unit 110. The controller 120 may approve the local login request when the PIN code transmitted to the mobile terminal 200 and the received PIN code match each other.

In addition, the controller 120 may receive job setting information from the mobile terminal 200, store the job setting information, apply the stored job setting information based on the local login information when the local login request is approved, and display, on the input and output unit 110, a job setting state to which the stored job setting information is applied.

The communicator 130 may perform wired/wireless communication with another device or a network. Accordingly, the communicator 130 may include a communication module, such as a transceiver, supporting at least one of various wired/wireless communication methods. For example, the communication module may be in a form of a chipset, or may be a sticker/barcode (for example, a sticker including an NFC tag) including information necessary for communication.

Wireless communication may include, for example, at least one of wireless fidelity (Wi-Fi), Wi-Fi direct, Bluetooth, an ultra-wide band (UWB), NFC, or the like. Wired communication may include, for example, at least one of universal serial bus (USB), high-definition multimedia interface (HDMI), or the like.

The communicator 130 may transmit or receive a signal or data by being connected to an external apparatus located outside the image forming apparatus 100. According to an example, the image forming apparatus 100 may be connected to the mobile terminal 200 through the communicator 130. The communicator 130 may transmit a signal or data received from the mobile terminal 200 to the controller 120, or transmit a signal or data generated by the controller 120 to the mobile terminal 200. For example, when the communicator 130 receives the remote login request or the local login request from the mobile terminal 200, the controller 120 may determine whether to approve the remote login or the local login. Also, when the communicator 130 receives a print command signal and print data from the mobile terminal 200, the controller 120 may output the received print data through the image forming job unit 150.

The communicator 130 may transmit or receive a signal or data by being directly connected to a server. Also, the communicator 130 may be connected to the mobile terminal 200 through the server. In other words, the communicator 130 of the image forming apparatus 100 may transmit or receive a signal or data to or from the mobile terminal 200 through the server.

A program, such as an application, and various types of data, such as a file, may be installed and stored in the memory 140. The controller 120 may access and use data stored in the memory 140, or store new data in the memory 140. Also, the controller 120 may execute a program installed in the memory 140. Also, the controller 120 may install, in the memory 140, an application received from an external source through the communicator 130.

According to an example, the memory 140 may store a program for processing the local login.

The image forming job unit 150 may perform an image forming job, such as printing, copying, scanning, faxing, or the like.

Figure 14:
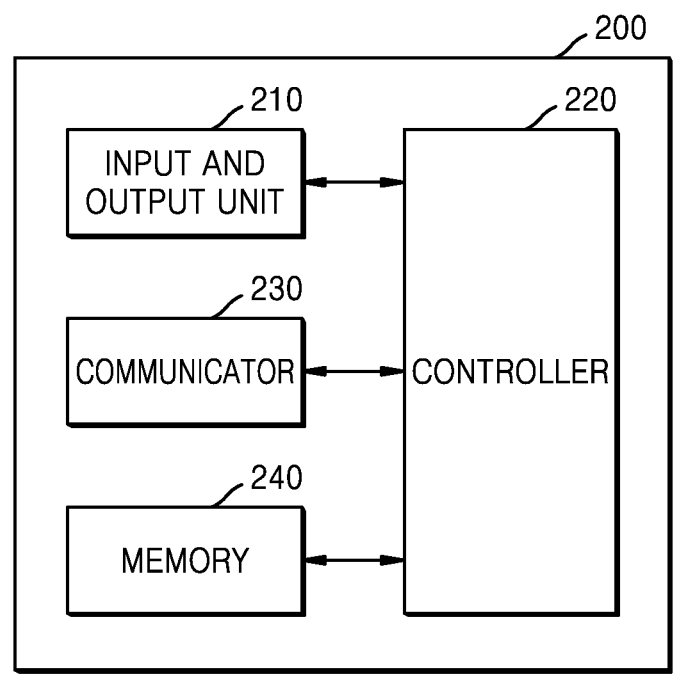
FIG. 14 is a diagram of a structure of a mobile terminal, according to an example.

FIG. 14 is a diagram of a structure of a mobile terminal, according to an example.

Referring to FIG. 14, the mobile terminal 200 may include an input and output unit 210, a controller 220, a communicator 230, and a memory 240.

The input and output unit 210 may include an input unit into which the user 10 inputs data for controlling the mobile terminal 200, and an output unit for displaying information processed by the mobile terminal 200.

As an example, the input unit may include a key pad, a dome switch, a touch pad (e.g., a touch capacitance type, a pressure resistance film type, an infrared light detecting type, a surface ultrasound conducting type, an integral tension measuring type, or a piezo-effect type), a jog wheel, a jog switch, etc. Also, the output unit may output an audio signal, a video signal, or a vibration signal, and may include a display, a speaker, a vibration motor, etc. Here, the display may be configured as a touch screen by forming a layer structure with a touch pad. However, the present disclosure is not limited thereto, and the input and output unit 210 may include an apparatus supporting various inputs and outputs.

According to an example, the input and output unit 210 may receive, from the user 10, user information, a local login execution command, a job setting value, an input of selecting one image forming apparatus from a list of valid image forming apparatuses, etc. Also, the input and output unit 210 may display a user interface, a PIN code, the list of valid image forming apparatuses, a web browser, or the like, to receive an input from the user 10.

The controller 220 may control operations of the mobile terminal 200, and may include a processor, such as a CPU. The controller 220 may control other components included in the mobile terminal 200 to perform an operation corresponding to a user input received through the input and output unit 210.

For example, the controller 220 may execute a program stored in the memory 240, read a file stored in the memory 240, or store a new file in the memory 240.

According to an example, the controller 220 may execute a program for processing local login to receive user information from the user 10, request the image forming apparatus 100 to undertake remote login based on the user information, receive session information from the image forming apparatus 100, store the session information, generate local login information based on at least some of the session information, and request the image forming apparatus 100 to undertake local login based on the local login information.

According to an example, the controller 220 may generate the local login information based on a session ID included in the session information and/or generate a PIN code based on the session information and generate the local login information based on the generated PIN code. Here, the controller 220 may generate the PIN code by using the same algorithm as the image forming apparatus 100.

According to an example, the controller 220 may control the input and output unit 210 to request the image forming apparatus 100 to issue a PIN code, receive a PIN code from the image forming apparatus 100, and display the received PIN code.

According to an example, the controller 220 may receive a job setting value from the user 10, store the job setting value as job setting information, and transmit the stored job setting information to the image forming apparatus 100.

According to an example, the controller 220 may control the input and output unit 210 to display a list of valid image forming apparatuses based on currently-stored session information and receive, from the user 10, an input of selecting the image forming apparatus 100 from the list, and may execute a session corresponding to the image forming apparatus 100 selected by the user 10.

According to an example, the controller 220 may generate a management webpage address of the image forming apparatus 100 based on the local login information, and access the management webpage address of the image forming apparatus 100 or transmit the management webpage address of the image forming apparatus 100 to a set device.

The communicator 230 may perform wired/wireless communication with another device or a network. Accordingly, the communicator 230 may include a communication module, such as a transceiver, supporting at least one of various wired/wireless communication methods. For example, the communication module may be in a form of a chipset, or may be a sticker/barcode (for example, a sticker including an NFC tag) including information necessary for communication.

Wireless communication may include, for example, at least one of Wi-Fi, Wi-Fi direct, Bluetooth, UWB, NFC, or the like. Wired communication may include, for example, at least one of USB, HDMI, or the like.

The communicator 230 may transmit or receive a signal or data by being connected to an external apparatus located outside the mobile terminal 200. According to an example, the mobile terminal 200 may be connected to the image forming apparatus 100 through the communicator 230. The communicator 230 may transmit, to the controller 220, a signal or data received from the image forming apparatus 100, or transmit, to the image forming apparatus 100, a signal or data generated by the controller 220. For example, when the controller 220 transmits a signal to the communicator 230 to perform remote login or local login, the communicator 230 may transmit a remote login request or a local login request to the image forming apparatus 100.

The communicator 230 may transmit or receive a signal or data by being directly connected to a server. Also, the communicator 230 may be connected to the image forming apparatus 100 through the server. In other words, the communicator 230 of the mobile terminal 200 may transmit or receive a signal or data to or from the image forming apparatus 100 through the server.

A program, such as an application, and various types of data, such as a file, may be installed and stored in the memory 240. The controller 220 may access and use data stored in the memory 240, or store new data in the memory 240. Also, the controller 220 may execute a program installed in the memory 240. Also, the controller 220 may install, in the memory 240, an application received from an external source through the communicator 230.

According to an example, the memory 240 may store a program for processing local login.

According to an example, the mobile terminal 200 requests the image forming apparatus to undertake local login by using session information of a session that has already begun, and thus the user 10 does not need to directly perform local login on the image forming apparatus 100. Accordingly, the user 10 may conveniently perform local login through a simple manipulation of the mobile terminal 200, for example, a small number of touch inputs, or the like.

While one or more examples have been described with reference to the figures, it will be understood by those of ordinary skill in the art that various changes in form and details may be made therein without departing from the scope of the disclosure as defined by the following claims.

What is claimed is:

1. A local login processing method of an image forming apparatus, the local login processing method comprising:
generating session information according to a remote login request upon receiving the remote login request from a mobile terminal;
transmitting the session information to the mobile terminal;
receiving, from the mobile terminal, a local login request comprising local login information generated by using at least some of the session information; and
approving the local login request by comparing the session information and the local login information,
wherein the local login information comprises a session identification (ID) included in the session information or a personal identification number (PIN) code generated based on the session information, and
wherein, when the local login information comprises the PIN code, the approving of the local login request based on the session information comprises:
generating a PIN code based on the session information; and
approving the local login request when the generated PIN code and the PIN code comprised in the local login information match each other.

2. The local login processing method of claim 1, wherein the approving of the local login request by comparing the session information and the local login information comprises approving the local login request by comparing the session information and the at least some of the session information comprised in the local login information.

3. The local login processing method of claim 1,
wherein the receiving, from the mobile terminal, of the local login request comprising the local login information generated by using the at least some of the session information comprises:
receiving a personal identification number (PIN) code issue request from the mobile terminal;
generating a PIN code based on the session information and transmitting the PIN code to the mobile terminal; and
receiving a PIN code through an input and output unit, and
wherein the approving of the local login request by comparing the session information and the local login information comprises approving the local login request when the PIN code transmitted to the mobile terminal and the received PIN code match each other.

4. The local login processing method of claim 1, further comprising:
receiving, from the mobile terminal, job setting information, and storing the job setting information;
when the local login request is approved, applying the stored job setting information based on the local login information; and
displaying a job setting state to which the stored job setting information is applied.

5. An image forming apparatus comprising:
an input and output unit;
a communicator to transmit and receive data to and from a mobile terminal;
a memory to store a program for a local login process; and
a controller to:
execute the program for the local login process to generate session information according to a remote login request upon receiving the remote login request from the mobile terminal,
transmit the session information to the mobile terminal,
receive, from the mobile terminal, a local login request comprising local login information generated by using at least some of the session information,
approve the local login request by comparing the session information and the local login information, and
control to perform an image forming job,
wherein the local login information comprises a session identification (ID) included in the session information or a personal identification number (PIN) code generated based on the session information, and
wherein, when the local login information comprises the PIN code, the controller generates a PIN code based on the session information, and approves the local login request when the generated PIN code and the PIN code comprised in the local login information match each other.

6. The image forming apparatus of claim 5, wherein the controller approves the local login request by comparing the session information and the at least some of the session information comprised in the local login information.

7. The image forming apparatus of claim 5, wherein the controller:
receives a personal identification number (PIN) code issue request from the mobile terminal,
generates a PIN code based on the session information and transmits the PIN code to the mobile terminal,
receives a PIN code through the input and output unit, and
approves the local login request when the PIN code transmitted to the mobile terminal and the received PIN code match each other.

8. The image forming apparatus of claim 5, wherein the controller:
receives, from the mobile terminal, job setting information, and stores the job setting information, when the local login request is approved,
applies the stored job setting information based on the local login information, and
displays a job setting state to which the stored job setting information is applied on the input and output unit.

9. A local login processing method of a mobile terminal, the local login processing method comprising:
- receiving user information from a user;
- requesting an image forming apparatus to undertake remote login based on the user information;
- receiving and storing session information from the image forming apparatus;
- generating local login information based on at least some of the session information; and
- requesting the image forming apparatus to undertake local login based on the local login information,
- wherein the generating of the local login information based on the at least some of the session information comprises:
- generating the local login information based on session identification (ID) included in the session information: or
- generating a personal identification number (PIN) code based on the session information and generating the local login information based on the generated PIN code, and
- wherein, when the local login information comprises the PIN code, a PIN code is generated based on the session information, and the local login request is approved when the generated PIN code and the PIN code comprised in the local login information match each other.

10. The local login processing method of claim 9, further comprising:
- receiving a job setting value from the user and storing the job setting value as job setting information; and
- transmitting the stored job setting information to the image forming apparatus.

\* \* \* \* \*